Feb. 26, 1935.   I. D. PERRY   1,992,764
AIR VALVE AND THE LIKE
Original Filed Jan. 12, 1933

Inventor
Ira D. Perry
By
Attorney

Patented Feb. 26, 1935

1,992,764

UNITED STATES PATENT OFFICE 1,992,764

AIR VALVE AND THE LIKE

Ira D. Perry, Chicago, Ill., assignor to Agnes S. Perry, Chicago, Ill.

Original application January 12, 1933, Serial No. 651,381, now Patent No. 1,923,501, dated August 22, 1933. Divided and this application April 3, 1933, Serial No. 664,249

10 Claims. (Cl. 273—65)

My invention relates to improvements in air valves and particularly the form of valve disclosed and described in my co-pending application Serial No. 651,381, filed January 12, 1933 now Patent 1,923,501, dated Aug. 22, 1933, of which this application is a division.

As described in my application above referred to, the invention relates to improvements in air valves especially intended for use in connection with inflated articles, such as foot balls, basket balls, etc.

An object of the invention is to provide an air valve made of rubber or other suitable resilient material which is so constituted that a very perfect sealing action is produced without the necessity of using special devices for closing the air passage. In this connection it is an object to so construct the valve that the same assumes a closing and air sealing condition when normally, laterally extending portions thereof are deflected and secured in abutting relation.

A further object of the invention is to provide an air valve of resilient material, such as rubber, having an air inflating portion, which portion is compressed to close and seal itself by resilient compression portions of the valve.

Another feature of the invention relates to the provision of a device of this character which is so constructed that it can be used either at the inside or the outside face of the bladder or wall of the inflated article. That is to say, the valve may be conveniently applied to either face of the wall of an article, according to the dictates of convenience. The other features of the invention relate to the provision of an air valve embodying the above features and which is so constructed that it may be made from a minimum amount of rubber or other resilient material, as will appear from a detailed description of the same in connection with the accompanying drawing, in which:

Figure 2:
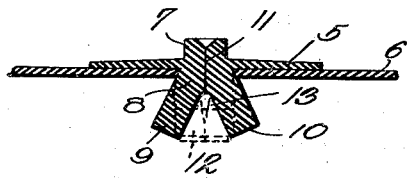
Fig. 2 is a vertical sectional view taken through the center of the lugs or wings of the valve, the lugs being shown in full lines spread apart in their normal inoperative position, and in dotted lines in their pinched together or sealing position; the valve being further illustrated as secured to the outer face of a bladder or other air container.

The valve of the instant case includes a flexible disc-like portion 5, of rubber or other similar material, which is adapted to be cemented to a wall 6 of the inflatable article, such as a bladder, as illustrated in Fig. 2. While this disc-like portion is shown cemented to the outer surface of a bladder or other air container it will be appreciated that the disc may be similarly secured to the inner surface, if desired, as this portion merely functions as a means to integrally attach the valve to a wall of the container.

At one side of the disc 5 is preferably formed a small inflating lug 7 which projects outwardly from the center of the valve and on the opposite side of the disc is formed an inward extension of the valve comprising an inflating body portion 8 from which project laterally extending wings or lugs 9 and 10. The lugs 9 and 10 are formed normally separated from each other to provide a substantially V-shaped notch or opening between the opposed outer faces of the lugs. A through passageway 11 is formed through the center of the lug 7 and inflating body portion 8 of the valve, by forcing an inflating needle through the resilient material of the valve, the passageway terminating at the center of the V-shaped opening between the lugs 9 and 10.

Figure 1:
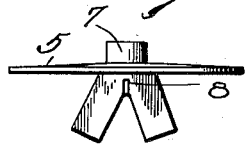
Fig. 1 is a side elevation of one form of valve embodying the features of the present invention.
Figure 3:
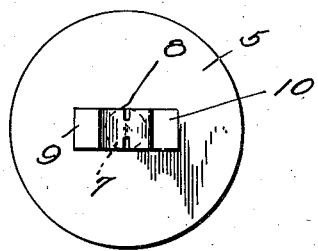
Fig. 3 is a bottom view of the valve shown in Fig. 1.
Figure 5:
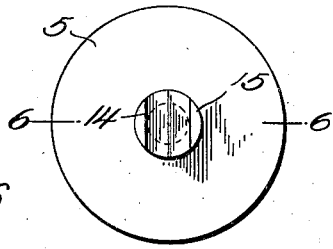
Fig. 5 is a view similar to Fig. 3 but illustrating a modified form of construction in which the sides of the wings or lugs are normally parallel to each other and showing the parts in the normal or unsealing position.
Figure 6:
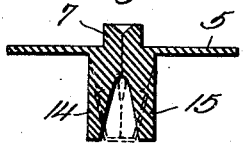
Fig. 6 is a vertical sectional view taken on lines 6—6 of Fig. 5, showing, by means of dotted lines, the position of parts when pinched together and secured for sealing the valve.
Figure 4:
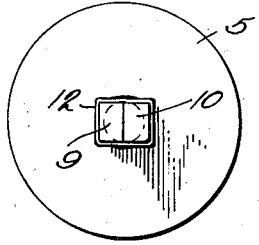
Fig. 4 is a view similar to Fig. 3 showing the lugs of the valve secured in abutting relation by a band or other retainer.

While the wings or lugs 9 and 10 are shown in full lines in their normal, laterally extending positions relative to the body 8, in Figs. 1 to 3, it will be understood that in the use of the valve the opposed faces of the lugs are secured in abutting relation as shown in dotted lines in Fig. 2, and in full lines in Fig. 4, by a band or other retainer 12. When the lugs are thus deflected and secured by the band 12, the intermediate resilient material of the inflating portion 8 of the valve is effectively pinched together at the center of the V-shaped opening, sealing the passageway 11 by the compression of the resilient material, but leaving a laterally extending opening 13 between the inner portions of the deflected lugs which communicates with the interior of the air container. The purpose of this lateral opening 13, when the lugs are secured in abutting relation, as above described, is to permit the article to be inflated or deflated by the use of a suitable tubular tool when forced through the passageway 11 into communication with the lateral opening 13. The valve shown in Figs. 5 and 6 is similar to that of Figs. 1 to 4, inclusive, with the exception that the outer side faces of the lugs 14 and 15 are molded or originally formed parallel to each other so that they may be more easily drawn from the molds. The result is that when said lugs are forced or pinched together in the dotted line position shown in Fig. 6, the opposed faces of the lugs are secured in partial abutting relation by a suitable securing means in the manner formerly described.

Figure 7:
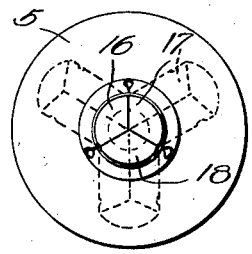
Fig. 7 shows an inside face or bottom view of a further modified form of valve in which three compression wings or lugs are employed, the lugs being shown secured in deflected abutting relation in full lines, and in normal extended positions in dotted lines.

In Fig. 7 I have shown a further modified form of device in which there are provided three companion lugs 16, 17 and 18, which may be forced or deflected towards each other and secured in the manner shown in full lines to compress the intermediate material of the inflating portion of the valve to effectively seal the inflating passageway extending therethrough.

I wish to make it clear that in each of these devices the inner end of the through passageway is normally sealed by a severe pinching action occasioned by the compression of the material of the valve body through which the passageway extends, which compression is brought about by the deflection of the rubber or other resilient material into a compressed condition between the connections of the lugs, with the body when the lugs are secured in abutting relation. Such an arrangement is clearly to be distinguished from one in which the sealing action of the passage is enhanced merely by a direct lateral pressure exerted on the body of the material at the sides of the passage since such direct lateral pressure must necessarily be very much larger in total amount than that necessary to pinch the end portion of the passageway; and also for the reason that where the pinching action is produced merely in the end of the passage it is produced at an angle to the axis of the passage as distinguished from being directly at right angles to said axis.

It will also be clear from the foregoing that in each of the arrangements herein illustrated it is contemplated that the inflation and deflation shall be produced by the use of a small tubular tool inserted through the air passageway and communicating with the interior of the article to be inflated or deflated.

While I have herein shown and described only certain embodiments of the features of my present invention, I do not intend to limit myself thereto, except as I may do so in the claims.

I claim:

1. An air valve for inflatable articles comprising a resilient member having a thickened portion through which an article inflating means is adapted to be inserted and compression lugs normally extending laterally from said thickened portion in diverging relation and having co-operating side faces adapted to be secured in abutting relation, whereby to compress the material of said thickened portion between the portions of the lugs connected therewith and prevent escape of air through said valve.

2. An air valve for inflatable articles comprising a resilient member having a thickened portion through which an article inflating means is adapted to be inserted and a pair of compression lugs normally extending laterally from opposite sides of said thickened portion and having co-operating side faces adapted to be secured in abutting relation, whereby to compress the material of said thickened portion between the portions of the lugs connected therewith.

3. An air valve for inflatable articles comprising a resilient body having lug portions projecting from one side thereof, said portions being normally spaced and having opposed faces disposed at an angle to one another, and a thickened portion extending from said body between the inner opposed faces of said lug portions through which an article inflating means is adapted to be inserted.

4. An air valve for inflatable articles comprising a resilient body divided longitudinally to provide lug portions projecting from one side thereof, said portions being normally spaced and having inner and outer opposed faces disposed at an angle to one another, a relatively narrow web portion connecting the opposed inner faces of said lug portions with said body, and a passageway extending through said body and web portion.

5. An air valve for inflatable articles comprising a resilient body having an article attaching portion and lug portions projecting from one side thereof, said lug portions being connected to each other adjacent said attaching portion and normally spaced outwardly therefrom, and a passageway extending through said body and connecting portions of said lugs.

6. An air valve for inflatable articles comprising a resilient body having an article attaching portion and a pair of lugs projecting from one side thereof, said lugs being connected to each other adjacent said attaching portion and normally spaced outwardly therefrom, said lugs having opposed inner and outer spaced faces, the outer spaced faces of said lugs being disposed at an angle to one another, a relatively narrow web portion extending between and connecting the opposed inner faces of said lugs with said body, and a passageway extending through said body and web portions.

7. As a new article of manufacture a valve member for an inflatable article comprising a disc of molded rubber having a pair of lugs extending inwardly from the inner face of said member, said lugs being so formed as to provide inner and opposite faces which flare away from each other when the material of the valve member is relaxed, there being a fine through passage extending through the valve member and terminating between the portions of said lugs closest to the body of the valve member, whereby when the lugs are forced towards each other to bring their inner surfaces into contact the material of the valve member at the inner end of the through passage is placed under compression, and means for drawing and retaining the lugs in such position.

8. As a new article of manufacture a valve member for an inflatable article comprising a disc of molded rubber having a pair of lugs extending inwardly from the inner face of said member, said lugs being so formed as to provide inner and opposite faces which flare away from each other when the material of the valve member is relaxed, there being a fine through passage extending through the valve member and terminating between the portions of said lugs closest to the body of the valve member, whereby when the lugs are forced towards each other to bring their inner surfaces into contact the material of the valve member at the inner end of the through passage is placed under compression.

9. As an improved article of manufacture, a rubber valve for an inflatable bladder for basketballs, footballs, or the like, said valve consisting in a neck portion extending through the walls of the bladder, and having an opening therethrough, a plurality of normally diverging arms on the inner portion of said valve within the inflatable bladder and adjacent said opening, and adapted to close said opening by compression caused by moving said plurality of arms into contact with each other.

10. As an improved article of manufacture, a rubber valve for an inflatable bladder for basketballs, footballs, or the like, said valve consisting in a neck portion extending through the walls of the bladder, and having an opening therethrough, a plurality of normally diverging arms on the inner portion of said valve within the inflatable bladder and adjacent said opening, and adapted to close said opening by compression caused by moving said plurality of arms into contact with each other, in combination with fastening means holding said arms in contact.

IRA D. PERRY.